United States Patent
Murfitt et al.

[15] 3,687,413
[45] Aug. 29, 1972

[54] FABRICATION OF PLASTIC SPINNERETTES BY MEANS OF STACKED MANDRELS

[72] Inventors: Donald Murfitt; James Bruce Peeso, Jr., both of Stamford, Conn.

[73] Assignee: American Cyanamid Company, Stamford, Conn.

[22] Filed: Dec. 15, 1969

[21] Appl. No.: 889,794

Related U.S. Application Data

[62] Division of Ser. No. 723,696, April 24, 1968, abandoned.

[52] U.S. Cl. .................. 249/160, 264/225, 425/186
[51] Int. Cl. ............................................. D01d 3/00
[58] Field of Search....18/8 SS, 8 R, 8 WB, 8 SM, 34, 18/42 D, 44; 249/124, 125, 160; 264/225, 241, 334; 76/107 AS

[56] References Cited

UNITED STATES PATENTS

| | | |
|---|---|---|
| 2,578,719 | 12/1951 | Mayer et al. ................ 18/42 D |
| 2,797,442 | 7/1957 | Wagner ................. 249/125 X |
| 3,226,771 | 1/1966 | Szugda ...................... 18/42 D |
| 3,312,583 | 4/1967 | Rochlis ................... 18/DIG. 8 |
| 3,551,936 | 1/1971 | Kutik et al. ............. 18/DIG. 8 |
| 3,357,058 | 12/1967 | Kutik ..................... 18/DIG. 8 |

*Primary Examiner*—J. Spencer Overholser
*Assistant Examiner*—Lucius R. Frye
*Attorney*—Philip Mintz

[57] ABSTRACT

The disclosed molding apparatus includes a plurality of mandrels, each in the form of a comb having spaced, parallel teeth, assembled into a mandrel stack. The mandrel stack is supported above a mold cavity into which the teeth extend. A plastic resin is poured into the mold and cured, and the mandrel stack is separated from the mold cavity to withdraw the teeth uniformly from the resulting casting. The holes left in one surface of the casting are filled with a grouting material, and the casting machined to form a finished spinnerette having shaped orifices.

9 Claims, 12 Drawing Figures

Patented Aug. 29, 1972

INVENTORS
DONALD MURFITT
JAMES BRUCE PEESO, JR.
BY

*Philip Mintz*

ATTORNEY

Patented Aug. 29, 1972

INVENTORS
DONALD MURFITT
JAMES BRUCE PEESO, JR.

BY

*Philip Mintz*

ATTORNEY

Patented Aug. 29, 1972

3,687,413

INVENTORS
DONALD MURFITT
JAMES BRUCE PEESO, JR.
BY
ATTORNEY

INVENTORS
DONALD MURFITT
JAMES BRUCE PEESO, JR.
BY
Philip Mintz
ATTORNEY

FABRICATION OF PLASTIC SPINNERETTES BY MEANS OF STACKED MANDRELS

This is a division of application Ser. No. 723,696, filed Apr. 24, 1968, now abandoned.

BACKGROUND OF THE INVENTION

Spinnerettes used in the production of various synthetic fibers have been made in various ways down through the years. The most difficult and expensive aspect of manufacturing spinnerettes lies in the formation of a multitude of extrusion orifices therein; the number os such orifices ranging in the thousands for some applications. Typically, these spinnerette orifices have been formed by punching or drilling holes in a metal sheet or cup. This is an expensive process, costing as much as 25 cents per hole, particularly when large numbers of closely spaced spinnerette orifices are required.

Recently, attention has been given to the use of plastics and glass as a spinnerette material. Plastic spinnerettes formed of epoxy resin for example, have been found to be particularly useful in the manufacture of shaped synthetic fibers by a wet spinning process. The poor thermal conductivity of the plastic reduces heat losses from the hot dope behind the spinnerette to the cold coagulant and thus assists in the maintenance of more uniform dope temperatures. More uniform dope flow rates at the spinnerette orifices are therefore achieved. In the copending application of Story and Bundegaard, Ser. No. 696,495, filed Jan. 9, 1968 and assigned to the assignee of the instant application, a process is described for spinning acrylic synthetic fibers of rectangular cross-section using plastic spinnerettes.

Various methods have been suggested for producing plastic spinnerettes. For example, in U. S. Pat. 2,623,241, a process is disclosed wherein a plastic is cast about a network of parallel wire filaments. After the casting is cured, the wire filaments are removed by an acid etch solution to produce spinnerette orifices. It will be appreciated that this manufacturing technique suffers from the distinct disadvantage that the most significant element of the casting apparatus, namely, the wire filaments, is destroyed in the production of each spinnerette. Consequently, it is virtually impossible to produce two identical spinnerettes by this process. In other words, it would be virtually impossible to obtain two spinnerettes having identical orifice patterns. This lack of reproducibility is a distinct drawback particularly when concerned with spinning high quality synthetic fibers. Moreover, this technique is expensive and time consuming since the casting apparatus must be effectively reconstructed prior to the casting of each spinnerette.

SUMMARY OF THE INVENTION

According to the present invention there is provided an improved method for producing spinnerettes employing novel casting apparatus. The method of the invention provides for the manufacture of a plurality of spinnerettes from the same casting apparatus. In other words, once the casting apparatus of the present invention is assembled, it is usable to produce a plurality of spinnerettes in succession. As a consequence, each of the spinnerettes so formed has identical spinnerette orifice dimensions and spacing. Moreover, the orifices in any one spinnerette are of uniform dimensions. The apparatus of the invention is particularly suited for forming spinnerettes having shaped orifices, and particularly orifices having rectangular cross-sections. The apparatus is however conducive to forming spinnerettes having various orifice configurations and dimensions.

The method of the present invention may be carried out expeditiously be relatively unskilled personnel. Quantity production of spinnerettes is achieved at a fraction of the cost of manufacture by prior art techniques. The casting apparatus of the invention, once assembled, need be only partially disassembled pursuant to each casting operation. The apparatus is in no way impaired or destroyed incident to a casting operation. In the event of inadvertent damage to a forming element of the casting apparatus, the apparatus may be disassembled and the damaged element replaced.

According to the method of the present invention, a mold is formed having a plurality of mandrel elements extending into a mold cavity. A castable material, such as an epoxy resin, is poured into the mold cavity such that the distal ends of the mandrel elements are submerged therein. After the resulting casting has hardened, the mandrel elements are withdrawn leaving a plurality of blind holes therein. The casting is removed from the mold and machined to the form and dimensions of a finished spinnerette with the holes becoming spinnerette orifices.

It is preferred that the holes formed in the casting be filled with a grouting material prior to grinding. Once the casting has been machined, the grouting material is then removed from the orifices. A mounting flange and reinforcing ribs may then be bonded to the spinnerette.

The casting apparatus includes a plurality of comb-like mandrels, each having a plurality of tooth-like elements extending in a common direction in parallel, spaced relation. The mandrels and mandrel spacers are assembled together to form a mandrel stack which is supported above the mold cavity. A jack mechanism, also included in the mandrel stack facilitates substantially uniform withdrawal of the mandrel teeth en masse from the spinnerette casting.

The mandrels are formed having a supporting strip or "backbone" with the toothlike elements or teeth joined thereto along one edge such as to extend generally in the same direction in parallel, spaced relation. The backbone of each mandrel is provided with means for aligning and mounting it in a mandrel stack assembly. All mandrels are of identical construction and may readily be replaced in the mandrel stack should the teeth break off or the mandrel otherwise damaged.

The invention accordingly comprises the several steps and the relation of one or the other of such steps with respect to each of the others and the apparatus embodying features of construction, combinations of elements and arrangements of parts which are adapted to effect such steps, all as exemplified in the following detailed description, and the scope of the invention will be indicated in the claims.

For a fuller understanding of the nature of the invention, reference should be had to the following detailed description taken in connection with the accompanying drawing, in which.

Like reference numerals refer to like parts throughout the several views of the drawings.

DETAILED DESCRIPTION OF THE INVENTION

Figure 1:
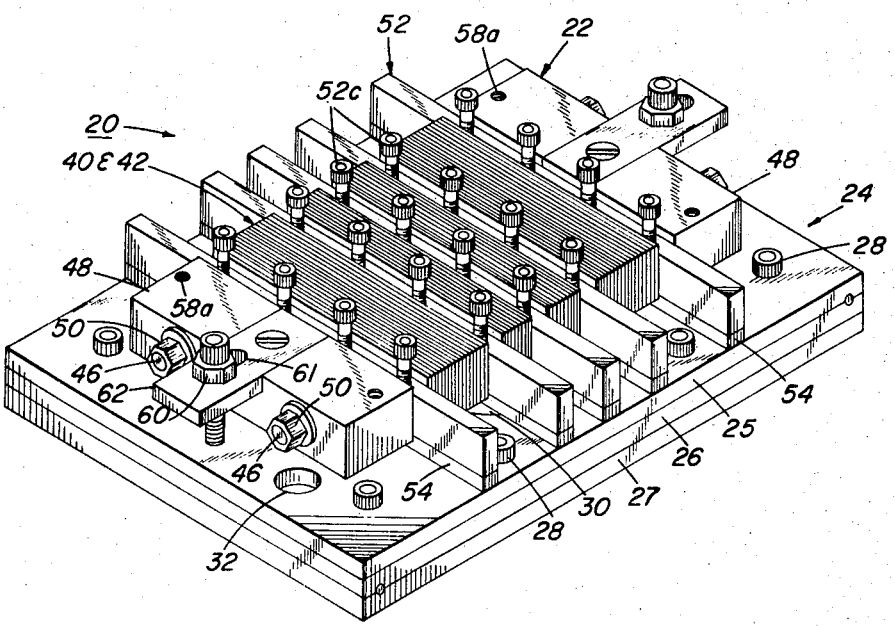
FIG. 1 is a perspective view of a molding apparatus constructed according to one embodiment of the invention for producing circular spinnerettes.
Figure 2:
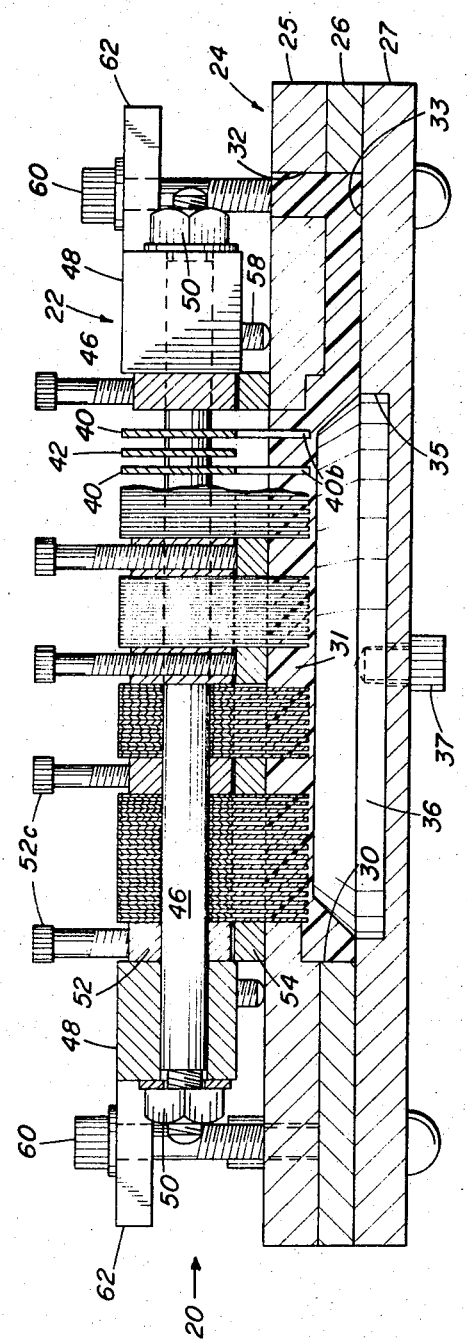
FIG. 2 is a side elevational, sectional view of the molding apparatus of FIG. 1.

According to one embodiment of the invention, a spinnerette casting apparatus, generally indicated at 20 in FIGS. 1 and 2, includes a mandrel stack assembly, generally indicated at 22, supported on a cavity mold assembly, generally indicated at 24. The cavity mold assembly 24 is comprised of three plate sections 25, 26, and 27 secured together in sandwich relation by bolts 28. As best seen in FIG. 2, the upper and middle plate sections 25 and 26, respectively, are centrally apertured so as to define a casting mold cavity 30 for containing a castable material 31, such as epoxy resin. A suitable resin is Eccobond 55, supplied by Emerson & Cumming, Inc. However, it is understood that a wide variety of castable materials will occur to those skilled in the art, and the instant invention is not to be deemed limited to any particular one or type.

The castable resin 31 contained in cavity 30 is introduced through a pour hole 32 in the top plate section 25. Pour hole 32 communicates with one end of a slot 33 in middle plate section 26, the slot opening into cavity 30. For purposes of illustration, the pour hole 32 and slot 33 are shown out of their true positions in FIG. 2. The bottom plate section 27 is formed having a circular recess 35 for receiving a core 36, which is secured in place by bolts 37. Since the core 36 is used mainly to conserve casting resin it may be omitted without departing from the invention.

Figure 3:
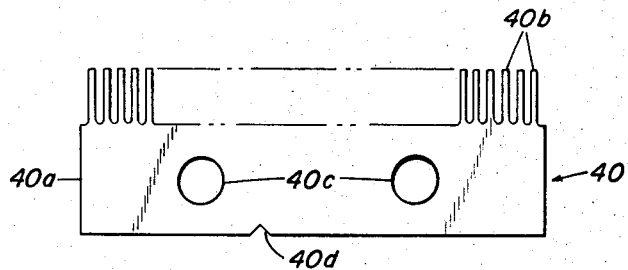
FIG. 3 is a side elevational view of one of the mandrels used in the apparatus of FIG. 1.

Still referring to FIGS. 1 and 2, the mandrel stack 22 includes a plurality of comb-like mandrels 40 alternating with mandrel spacers 42. Each mandrel, as best seen in FIG. 3, comprises a supporting strip or "backbone" 40a carrying a plurality of teeth 40b distributed along one edge thereof. The teeth lie in the plane of the backbone 40a and depend therefrom in parallel, spaced relation. Holes 40c, formed in the backbone 40a, facilitate alignment and assembly of the individual mandrels 40 in the mandrel stack 22, as will be described.

The mandrels 40 are preferably formed by photoetching from thin strips of a suitable metal such as beryllium copper alloy. However, it will be appreciated that the mandrels 40 need not be formed from a strip as the teeth 40b may be butt-welded or otherwise secured along one edge of the backbone 40a. Other ways of forming the mandrels 40 will occur to those skilled in the art.

The thickness of the backbone 40a and teeth 40b may vary depending on the dimensional characteristics of the spinnerette to be formed, but typically is less than 0.04 inches. Exemplary mandrel dimensions may be 0.003 inch for the thickness of the backbone and teeth, 0.015 inch for the width of each tooth, and 0.073 inch spacing between teeth. Each mandrel may have any number of teeth. The mandrel teeth need not be of uniform size along their lengths, but may be tapered down at their distal ends. As will be appreciated, their distal ends cannot, however, be larger in size than their proximal ends. While the mandrel teeth are shown to be rectangular in cross-section, thus forming spinnerette orifices for spinning ribbon-shaped fibers, it will be appreciated that the mandrel teeth may be of any desired cross-section. Moreover, the thickness of the backbone 40a need not correspond to the thickness of the teeth 40b. If the backbone is made thicker than the teeth, the mandrel spacers 42 could be omitted from the mandrel stack 22.

Figure 4:
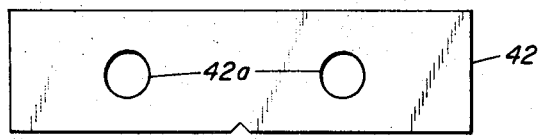
FIG. 4 is a side elevational view of a mandrel spacer used in the apparatus of FIG. 1.

Each of the mandrel spacers 42, best seen in FIG. 4, is formed of a suitable metal such as copper and has length and width dimensions corresponding to the mandrel backbones 40a. The thickness of the spacers is determined by the spacing desired between the teeth of adjacent mandrels. Holes 42a in the mandrel spacers are provided for purposes of aligning and assembling them in alternating relation with the mandrels 40 in the mandrel stack 22.

Returning to FIGS. 1 and 2, the mandrels 40 and mandrel spacers 42 are threaded onto a pair of elongated clamp rods 46 which extend through the holes 40c in the mandrels and the holes 42a in the mandrel spacers. The ends of the clamp rod 46 extend through bores in opposing clamp blocks 48. Nuts 50 threaded on the ends of the clamp rods 46 serve to clamp the mandrels 40 and mandrel spacers 42 between clamp blocks 48.

Also included in the mandrel stack 22 are a plurality of jack spacers, generally indicated at 52, whose function is to assist in withdrawal of the mandrel stack from the cavity mold 24, as will be described. The jack spacers 52, inserted at spaced intervals in the mandrel stack 22, are each constructed in the manner shown in FIG. 5. Thus, each jack spacer 52 includes an elongated bar 52a of rectangular cross-section having transverse holes 52b for receipt of the clamp rods 46 upon assembly into the mandrel stack 22. A plurality of jack screws 52c are accommodated in threaded bores in the bar 52a. These threaded bores extend in a direction transverse to the holes 52b such that the jack screws 52c are vertically oriented when the jack spacers are assembled in the mandrel stack 22.

Figure 5:
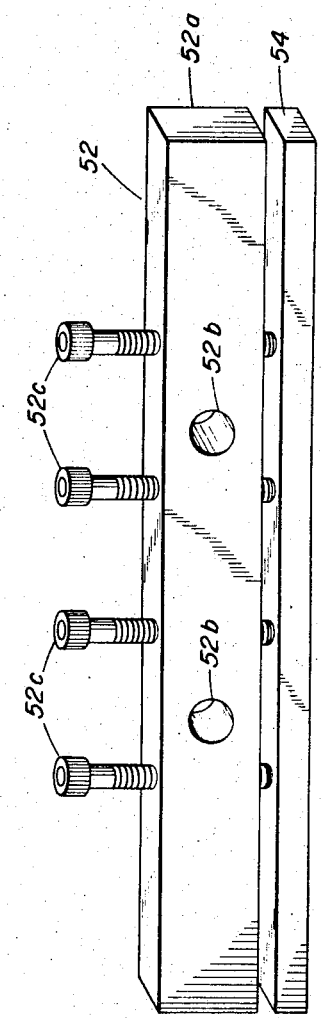
FIG. 5 is a perspective view of a jack spacer and a thrust bar used in the apparatus of FIG. 1.

Included with each jack spacer 52 in the mandrel stack 22 is a thrust bar 54, one of which is stationed immediately beneath each jack spacer (FIG. 5). The extremities of the thrust bars 54 are supported on the top surface of the upper cavity mold plate section 25 beyond the mold cavity 30, as seen in FIG. 1.

As best seen in FIG. 2, the mandrel stack is supported on the cavity mold 24 with the mandrel teeth 40b extending into the mold cavity 30. It will be noted that only the distal ends of the mandrel teeth enter the mold cavity 30 and that the free ends thereof are spaced from the cavity floor. A plurality of leveling set screws 58 received in threaded bores 58a in clamp blocks 48 bear against upper plate section 25 to level the mandrel stack 22 relative to the cavity mold assembly 24. Once the mandrel stack is leveled, a bolt 60 is passed through an elongated slot 61 in a mounting bar 62 affixed to each clamp block 48 and threaded into a tapped hole in the upper plate section 25 to rigidly secure the mandrel stack to the cavity mold 24.

The casting apparatus of FIGS. 1 and 2 may be used to cast a spinnerette blank having any desired configuration by appropriate shaping of the mold cavity 30. If it is desired that the cast spinnerette have a circular configuration, then the mold cavity should preferably also be circular. It becomes necessary to snap off those mandrel teeth 40b which interfere with the cavity mold 24 beyond the cavity 30. Alternatively, those mandrels 40 assembled adjacent to the clamp blocks 48 could be provided with a lesser number of teeth than those near the center of the mandrel stack 22.

Returning briefly to FIG. 3, the holes 40c in the backbone 40a of each mandrel 40 are slightly asymmetrically arranged relative to the mid-length center line thereof. Each mandrel is also provided with an edge notch 40d offset from the mid-length center line. If the mandrels are assembled in the mandrel stack such that the notch 40d alternates right and left of the mid-length center line, and the asymmetry of the holes 40c is such that the teeth of one mandrel are aligned with the teeth gaps in the adjacent mandrels, the spacing between rows of teeth may be reduced. By employing this assembly technique, a greater number of holes may be formed in the spinnerette blank without weakening its structual integrity.

The preferred method by which a spinnerette blank is cast using the apparatus of FIGS. 1 and 2, and a finished spinnerette formed will now be described.

Once the cavity mold 24 is assembled, the recess 35 which accommodates the core 36 is filled with a fillet of a suitable adhesive sealant and the core 36 is secured in place with bolts 37. This sealant prevents the casting resin from seeping into the recess 35 and impeding removal of the cured casting from the cavity 30. If the core 36 is dispensed with, this operation is not necessary, except that the holes accommodating bolts 37 must be sealed off. Prior to assembly of the mandrel stack 22, the mandrels 40 are cleaned with a suitable cleansing agent. After the mandrel stack has been assembled, the mandrel teeth and thrust bars 54 are given an application of a suitable mold release agent, as is the surface of the cavity 30. Prior to mounting the mandrel stack atop the cavity mold 24, the thrust bars 54 are secured to the bottoms of the jack spacers 52 with rubber bands. This is preferred to laying the thrust bars across the cavity 30 as the risk of damaging the mandrel teeth during mounting the mandrel stack is lessened.

Once the mandrel stack 22 is mounted atop the cavity mold 24, it is leveled with set screws 58 (FIG. 2). Bolts 60 are then inserted and tightened down to secure the mandrel stack in place. The rubber bands are removed, freeing the thrust bars, and the various jack screws 52c are turned hand tight. The apparatus of FIGS. 1 and 2 is then ready for casting.

The casting resin to which a suitable catalyst may be added is deaerated in a vacuum. The casting resin is then poured into the pour hole 32 to fill the cavity 30. It is important that the cavity be filled to the point where the resin contacts the bottom surface of the thrust bars 54. This is necessary to insure a firm footing of the thrust bars on the cast spinnerette blank as the mandrel stack is removed after the cure. It should be noted that the level of the casting resin 31 in cavity 30 is below the bottoms of the mandrel backbones 40a and spacers 42, as seen in FIG. 2.

The casting is then oven cured, preferably at low curing temperatures for a length of time calculated to minimize post-cure shrinkage and to allow sufficient time for entrapped air bubbles to rise to the surface. After the cast spinnerette blank has been cured, the casting apparatus is removed from the curing oven and the bolts 60 are removed. The various jack screws are turned hand tight and then are each tightened about one quarter to one-half a turn in repeating sequence. The tightening program for the jack screws should be such as to maintain the mandrel stack 22 substantially level or horizontal at all times as it is separated from the cavity mold 24. It will be appreciated that excessive tipping of the mandrel stack can result in bending of the mandrel teeth and damage to the hole pattern produced in a subsequently cast spinnerette blank. When the mandrel stack is completely withdrawn from the cast spinnerette blank, a plurality of blind holes are left therein by the mandrel teeth. The configuration of each hole is in conformity with the cross-section of the mandrel tooth forming it. Withdrawal of the mandrel stack is preferably effected while the casting is still near the curing temperature and thus before any post cure shrinkage sets in.

The bolts 28 are then removed and the plate sections 25, 26 and 27 of the cavity mold assembly 24 are separated to extract the cast spinnerette blank.

At this point it is preferable to subject the cast spinnerette blank to a second cure at a temperature somewhat higher than that of the initial cure. This second cure appears to develop the full flexural strength of the resin. Sudden cooling of the cast spinnerette blank after the initial or the second tempering cure should be avoided to prevent the development of internal stresses.

The cast spinnerette blank must now be machined to the configuration and dimensions of a finished spinnerette. Before this is done, however, the blind holes in the blank left by the mandrel teeth should be filled with grout to support the hole edges and to prevent resin chips from being forced into the holes during machining. Suitable grouting materials are gelatin, Wood's metal, para-dichloro benzene and water glass. It has been found desirable to degrease the spinnerette blank with methyl chloroform or trichloroethylene to facilitate the application of the grouting material. The grouting material may be applied in a vacuum desiccator.

Figure 6:
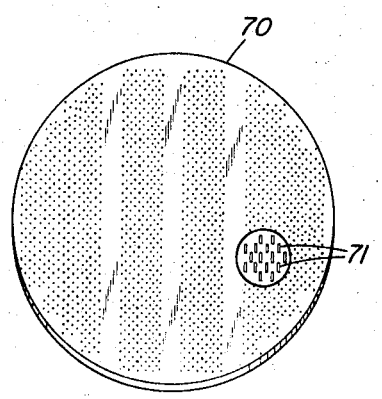
FIG. 6 is a perspective view of a spinnerette plate produced using the apparatus of FIG. 1.
Figure 7:
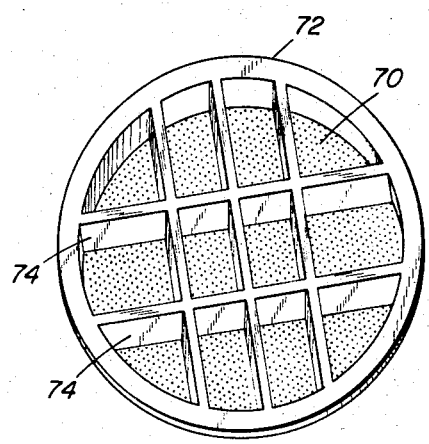
FIG. 7 is a perspective view of the spinnerette plate of FIG. 6 adapted with a mounting flange and reinforcing ribs.

Machining of the spinnerette blank entails turning to a finished diameter, turning of the front and back faces, and finish grinding of the two faces. At the conclusion of the machining operation, the holes left by the mandrel teeth extend from the front to the back faces of the spinnerette. The grouting material is then removed by any suitable means such as an ultrasonic water bath. The addition of a suitable solvent in the ultrasonic water bath facilitates grout removal. The finished spinnerette 70 is in the form shown in FIG. 6. The holes formed by the mandrel teeth are now spinnerette orifices 71 each of a shape conforming to the cross-section of the mandrel teeth.

In order to provide spinnerette 70 with added structual strength and to adapt it for mounting to an extrusion head, an annular mounting flange 72 and crisscrossing reinforcing ribs 74 are bonded to it. Preferably, the annular flange 72 and reinforcing ribs 74 are formed and bonded to the spinnerette 70 in a second casting apparatus (not shown). The spinnerette 70 is placed in the bottom of a mold cavity and a waffle-like core is placed over it to cover the spinnerette orifices 71 located between the reinforcing ribs 74 to be formed. The casting resin, which may be the same as that used in the formation of the spinnerette 70, is introduced into the mold cavity and the casting apparatus placed in a vacuum for several minutes. The vacuum is then broken, and the resin is forced into the spinnerette orifices 71 left uncovered by the core, thus insuring a strong bond between the mounting flange 72 and reinforcing ribs 74 and the spinnerette plate 70.

The cast spinnerette assembly is then cured and the mounting flange 72 and reinforcing ribs 74 are machined, as required. Typically the only machining required is that of turning the spinnerette assembly to finish off the annular mounting flange 72 to the desired final dimensions.

Rather than forming the annular mounting flange 72 and reinforcing ribs 74 and bonding them to the spinnerette 70 in a separate casting apparatus, it will be appreciated that all three components may be cast simultaneously in a single casting apparatus to form a unitary assembly. However, machining becomes somewhat more complex.

The casting apparatus of FIGS. 1 and 2 is adapted to the formation circular spinnerettes 70 (FIG. 6), as has been described. With appropriate modifications, exemplified in the casting apparatus of FIGS. 8 and 9, annular spinnerettes may be cast. The above described method of making spinnerettes using the apparatus in FIGS. 1 and 2 is equally applicable to the production of annular spinnerettes.

Figure 8:
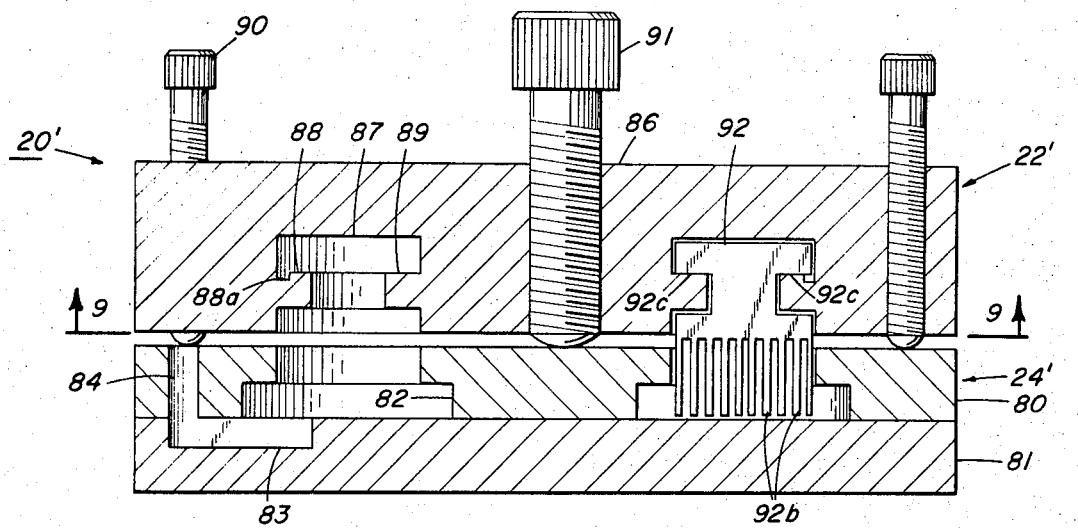
FIG. 8 is a side elevational, sectional view of second embodiment of the invention for producing annular spinnerettes.
Figure 9:
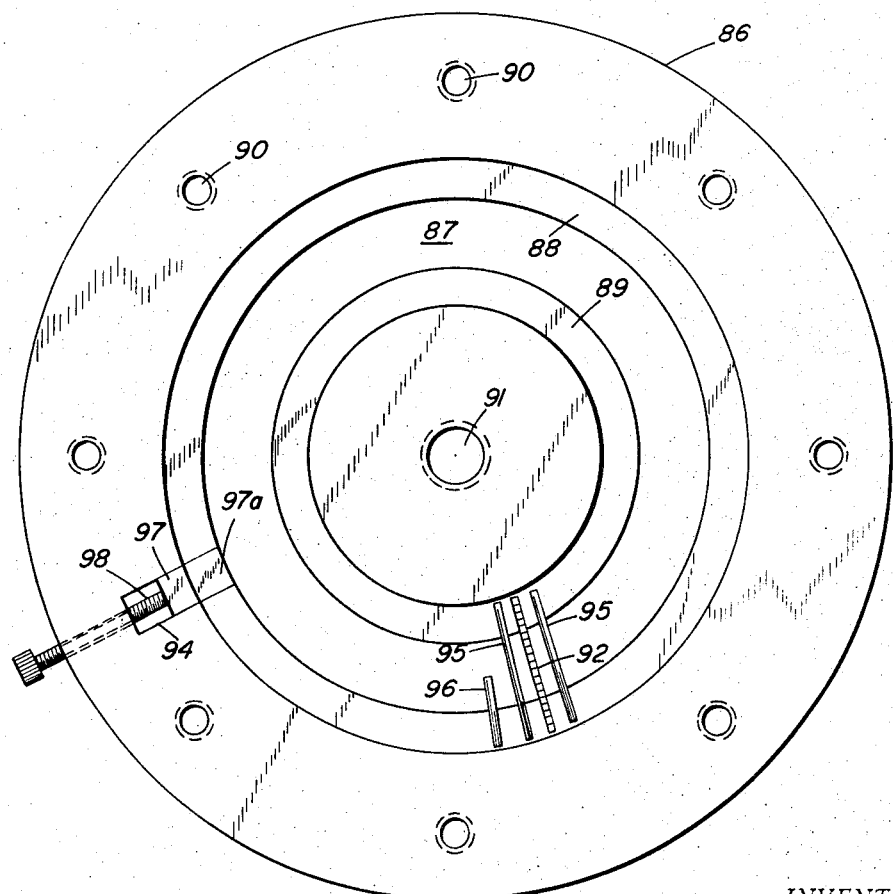
FIG. 9 is a sectional view taken along line 9—9 of FIG. 8.

Referring now to FIGS. 8 and 9, the spinnerette casting apparatus, generally indicated at 20', includes a mandrel stack assembly, generally indicated at 22', supported on a cavity mold assembly generally indicated at 24'. The assembly 24' includes an upper plate section 80 and a lower plate section 81, which are secured together by suitable means such as bolts (not shown). The upper plate section 80 is machined so as to provide an annular mold cavity 82. An elongated groove 83 in the upper surface of plate section 81 extends between the mold cavity 82 and a pour hole 84 in plate section 80 to accommodate pouring the mold.

The mandrel stack 22', seen in both FIGS. 8 and 9, includes a head block 86 in which is formed an annular channel 87. A pair of annular flanges 88 and 89 extend into the channel 87 from its sidewalls. A peripheral array of jack screws 90 together with a centrally disposed larger jack screw 91 are threaded through the head block 86 of the mandrel stack 22' and into abutting engagement with the upper surface of plate section 80 when the mandrel stack is positioned atop the cavity mold assembly 24'.

Figure 10:
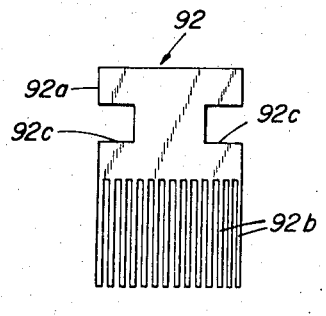
FIG. 10 is a side elevational view of one of the mandrels used in the apparatus of FIGS. 8 and 9.

Mandrels 92, best seen in FIGS. 8 and 10, like the mandrel 40 in FIG. 3 are comb-like structures having a backbone or mounting strip 92a supporting a plurality of teeth 92b. Instead of aligning and assembling holes, the mandrels 92 have a notch 92c formed in each vertical edge of the backbone 92a. As best seen in FIG. 8, the mandrels 92 are introduced into the channel 87 in the mandrel stack head block 86 with the flanges 88 and 89 engaging the mandrel notches 92c, thus retaining them in the mandrel stack 22'. As seen in FIG. 9, a keyway slot 94 is formed in the mandrel stack head block 88. The inner end of slot 94 opens into the annular channel 87. A plug 97, accommodated in keyway slot 94, is moved to the closed end thereof such that the mandrels 92 may be introduced into the channel 87 by way of the slot.

Figure 11:
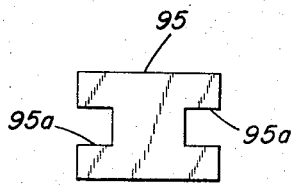
FIG. 11 is a side elevational view of one form of mandrel spacer used in the apparatus of FIGS. 8 and 9.

In addition to the mandrels 92, full mandrel spacers 95 are also loaded into the mandrel stack 22'. The full mandrel spacers 95, seen in FIG. 11, are provided with notches 95a which are engaged by the annular flanges 88 and 89 in the channel 87, thus also retaining them in the mandrel stack. As in the apparatus of FIGS. 1 and 2, the mandrel stack 22' is loaded such that the full mandrel spacers 95 are interposed between adjacent mandrels 92.

Figure 12:
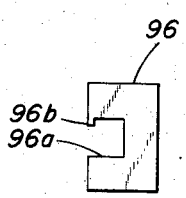
FIG. 12 is a side elevational view of another form of mandrel spacer employed in the apparatus of FIGS. 8 and 9.

In order to take up the additional distance around the outer circumference of the channel 87 and to maintain the mandrels 92 substantially radially aligned in the mandrel stack 22', half spacers 96, best seen in FIG. 12, are also loaded into the channel 87. The half spacers 96 are formed having a single notch 96a which is engaged by the outer annular flange 88 in channel 87. A small tooth 96b, carried by the half spacers 96, is received in an annular groove 88a formed in outer flange 88 (FIG. 8) to retain the half spacers in the channel.

A typical loading pattern would be a full mandrel spacer, a mandrel, a full mandrel spacer and then a half spacer 96 in repeating sequence. Periodically, additional half spacers 96 are inserted in order to achieve substantial radial alignment of the mandrels 92 in the mandrel stack 22'.

After the mandrel stack 22' has been fully loaded, the plug 97 is pushed inwardly by advancement of a screw 98. A tongue 97a at the inner end of plug is thus brought into engagement with the notches in the mandrels and mandrel spacers in channel 87 opposite slot 94 to prevent them from falling out when the mandrel stack 22' is righted and placed atop the cavity mold 24'.

Once the casting resin has been poured into the mold cavity 82 and cured, the jack screws 90 and 91 are systematically tightened so as to withdraw the mandrel teeth 92a from the cast spinnerette blank en masse while maintaining the mandrel stack 22' substantially level. After the mandrel stack 22' is fully withdrawn, the cavity mold assembly 24' is separated and the cast spinnerette blank is extracted. The blank is processed in the manner previously described to form a finished annular spinnerette having orifices conforming in size and shape to the mandrel teeth 92a.

It will thus be seen that the objects set forth above, among those made apparent from the preceding descriptions, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described the invention, what is claimed as new and is desired to secure by Letters Patent is:

1. A mandrel stack assembly for use as part of a casting apparatus for casting spinnerette blanks comprising, in combination,
   A. a plurality of comb-like mandrel units, each such mandrel unit comprising a thin, substantially planar backbone to which are affixed a plurality of tooth-like core elements disposed in a single row along an edge of and in the same plane as said backbone, each of said tooth-like core elements having a maximum thickness identical to the thickness of said thin, substantially planar backbone and being spaced from and substantially parallel to all the others of said tooth-like core elements, said substantially planar backbone being less than about 0.04 inches thick;
   B. a plurality of spacer units, each such spacer unit comprising a thin, substantially planar member;
   C. the backbones of said comb-like mandrels and the planar members of said spacer units each being provided with means for mounting and aligning a plurality of said comb-like mandrels and said spacer units in a mandrel stack with the comb-like teeth of said mandrels extending freely beyond the limits of said spacer units; and
   D. means for securing together as a stack assembly said plurality of comb-like mandrel units and said plurality of spacer units;
   E. said stack assembly having at least one such spacer unit disposed between the backbones of adjacent comb-like mandrel units.

2. A mandrel stack assembly as defined in claim 1 wherein said means for mounting and aligning said comb-like mandrels and said spacer units comprises a plurality of holes therethrough and wherein said means for securing them together as a stack assembly comprises a pair of clamp blocks and a plurality of clamp rods which pass through the aforesaid holes through said comb-like mandrels and said spacer units.

3. A mandrel stack assembly as defined in claim 2 including a jack mechanism comprising a jack spacer and a thrust bar, said jack spacer comprising an elongated bar provided with a plurality of holes through which pass said plurality of clamp rods and a plurality of jack screws extending transversely through said elongated bar parallel to said tooth-like core elements, said thrust bar being immediately adjacent said jack spacer in contact with the ends of said jack screws, said jack mechanism serving to withdraw said tooth-like core elements from a cast spinnerette blank when said jack screws are tightened against said thrust bar which presses against said cast blank.

4. A mandrel stack assembly as defined in claim 1 wherein said means for mounting and aligning said comb-like mandrels and said spacer units comprises notches in the backbones of said comb-like mandrels and in said spacer units and wherein said means for securing them together as a stack assembly comprises a head block provided with an annular channel of dimensions corresponding to the dimensions of the backbones of said comb-like mandrels and of said spacer units, said head block being provided with annular flanges within said annular channel located and dimensioned to fit within said notches when said comb-like mandrels and said spacer units are located in said head block.

5. A mandrel stack assembly as defined in claim 4 also including a plurality of half spacers disposed within said annular channel adjacent the larger circumference thereof.

6. A mandrel stack assembly as defined in claim 1 in combination with a mold having a cavity into which a castable material can be introduced wherein said mandrel stack assembly is disposed so said tooth-like core elements extend into said mold cavity.

7. A mandrel stack assembly as defined in claim 3 in combination with a mold having a cavity into which a castable material can be introduced wherein said mandrel stack assembly is disposed so said tooth-like core elements extend into said mold cavity and so a side of said thrust bar remote from where said jack screws contact it forms a portion of the mold cavity wall.

8. A mandrel stack assembly as defined in claim 4 in combination with a mold having a generally annular cavity into which a castable material can be introduced wherein said mandrel stack assembly is disposed so said tooth-like core elements extend into said mold cavity.

9. A mandrel stack assembly in combination with a mold as defined in claim 8 wherein said mandrel stack assembly is provided with a plurality of jack screws extending therethrough parallel to said tooth-like core elements, the ends of said jack screws bearing against said mold outside said annular cavity.

* * * * *